United States Patent Office 2,795,614
Patented June 11, 1957

2,795,614

METHOD OF MAKING PARA-AMINO-BENZALDEHYDE

Oliver De Garmo and Eugene J. McMullen, St. Louis, Mo., assignors to Monsanto Chemical Company, St. Louis, Mo., a corporation of Delaware No Drawing. Application November 12, 1953, Serial No. 391,734

7 Claims. (Cl. 260—580)

This invention relates to a method of making para-aminobenzaldehyde from para-nitrotoluene.

Geigy, in D. R. P. 86, 874, April 13, 1896, discloses that when para-nitrotoluene is reacted with elemental sulfur in an aqueous alcoholic solution of an alkali metal hydroxide, para-aminobenzaldehyde and para-toluidine are produced. A detailed study of this process has shown that the average yield of each product is about 40% by weight based upon the para-nitrotoluene charged and that the oxidation-reduction reaction producing para-aminobenzaldehyde and the straight reduction reaction producing para-toluidine, respectively, proceed simultaneously and at substantially the same rate. The disadvantages of this mode of manufacturing para-aminobenzaldehyde were early appreciated and amongst the variations tried in an effort to improve operational efficiency was the employment of various alkali metal sulfides instead of sulfur. The literature shows (Beard et al., J. Chem. Soc., 1944, pages 4–5) the yield of para-aminobenzaldehyde based upon para-nitrotoluene obtained employing Geigy's process wherein sulfur is replaced by an alkali metal monosulfide is about 40% by weight, and with an alkali metal disulfide, trisulfide, and tetrasulfide, respectively, the yields are about 5%, 12% and 30% by weight higher. Although the yields of para-aminobenzaldehyde increase as the atom ratio of sulfur to alkali metal increases, so also do the undesirable side reactions. These side reactions appreciably decrease the overall efficiency of the process and in addition present a difficult, time-consuming and expensive impurity removal problem. As a result the employment of alkali metal sulfides in place of elemental sulfur in Geigy's process has not been considered entirely satisfactory in the large scale manufacture of para-aminobenzaldehyde from para-nitrotoluene.

It is an object of this invention to provide an improved method of making para-aminobenzaldehyde from para-nitrotoluene. It is a further object to provide an efficient and economical process for the manufacture of para-aminobenzaldehyde from para-nitrotoluene employing an alkali metal sulfide. It is a particular object of this invention to provide a commercially feasible process for the manufacture of para-aminobenzaldehyde from para-nitrotoluene by the employment of an alkali metal sulfide and elemental sulfur. Further objects will be apparent to those skilled in the art.

In accordance with this invention, it has been found that these objects are accomplished by heating a mixture comprising para-nitrotoluene and an alkali metal sulfide of the formula $M_2S_x$, where M is an alkali metal and where $x$ is a whole number wherein the atom ratio, or ratio of atoms, of alkali metal charged as the sulfide to sulfur throughout the course of the reaction is maintained within the range of about one atom of alkali metal per one to two atoms of sulfur.

In accomplishing the objects of this invention a mixture comprising para-nitrotoluene, an alkali metal sulfide and an aqueous solution of an alkali metal hydroxide is heated to a temperature at which the reaction begins, whereupon elemental sulfur is suitably introduced into the reaction mix as the reaction proceeds in an amount sufficient to maintain an atom ratio of alkali metal charged as the sulfide to sulfur of about one of the former to one to two of the latter. The rate of the reaction as conducted in accordance with this invention is directly proportional to the rate of consumption of sulfur and in that the rate of reaction is also proportional to the temperature of the reaction, those skilled in the art can readily determine the time required to complete the reaction at the temperature employed and thus adjust the amount and rate of addition of elemental sulfur accordingly.

The following is illustrative of this invention but is not to be construed as limitative thereof.

Example I

An aqueous alcoholic solution of sodium disulfide ($Na_2S_2$) is prepared as follows:

To a mixture containing approximately 147 parts by weight ethyl alcohol, approximately 360 parts by weight water, approximately 54 parts by weight (substantially 0.23 molecular weight) of sodium monosulfide nonahydrate ($Na_2S \cdot 9H_2O$) and approximately 7.5 parts by weight (substantially 0.23 atomic weight) of elemental sulfur is added with agitation approximately 82.3 parts by weight (substantially 1 molecular weight) of a 48.6% by weight aqueous solution of sodium hydroxide.

To the sodium disulfide solution so formed is added approximately 90 parts by weight (substantially 0.66 molecular weight) of para-nitrotoluene. The resultant heterogeneous mix so obtained is heated to reflux and held at the reflux temperature while incorporating in the refluxing mixture at the rate of 7.5 parts per hour a total of approximately 15 parts by weight (substantially 0.46 atomic weight) of elemental sulfur. The refluxing is continued for an additional two hours and thereafter the batch is stripped of alcohol and steam-distilled. Thereupon the steam-distilled residue is cooled to about 2° C. and the crude para-aminobenzaldehyde product is separated via centrifugation as a non-crystalline solid, which solid on warming to room temperature liquifies to a viscous oily product. The yield of para-aminobenzaldehyde is approximately 81 parts by weight which based upon the para-nitrotoluene charged is substantially 100%.

In that para-aminobenzaldehyde is unstable at room temperature it has been found particularly convenient to preserve it for subsequent use by acetylation with acetic anhydride in aqueous acetic acid. The acetylated product so formed is para-formyl-acetanilide which is a particularly useful intermediate in the manufacture of other organic chemicals such as dyes and pharmaceuticals.

In Example I the atom ratio of alkali metal charged as the sulfide to sulfur was maintained at substantially equi-atomic proportions, i. e. 1:1, throughout the course of the reaction. While a substantially equi-atomic ratio of alkali metal to sulfur is a particularly preferred embodiment of this invention, other atomic ratios have been found satisfactory provided the atomic ratio was kept within the range of about one atom of alkali metal charged as the sulfide per one to two atoms of sulfur throughout the reaction.

As further illustrative of this invention is the following:

Example II

An aqueous alcoholic solution of sodium trisulfide ($Na_2S_3$) is prepared as follows:

To a mixture containing approximately 147 parts by weight ethyl alcohol, approximately 360 parts by weight water, approximately 54 parts by weight (substantially 0.23 molecular weight) of sodium monosulfide nonahydrate ($Na_2S \cdot 9H_2O$) and approximately 15 parts by weight (substantially 0.46 atomic weight) of elemental sulfur is added with agitation approximately 82.3 parts by weight (substantially 1 molecular weight) of a 48.6% aqueous solution of sodium hydroxide.

To the sodium trisulfide solution so formed is added approximately 90 parts by weight (substantially 0.66 molecular weight) of para-nitrotoluene. The resultant heterogeneous mix so obtained is heated to reflux and held at the reflux temperature while incorporating in the refluxing mixture at the rate of 7.5 parts per hour a total of approximately 15 parts by weight (substantially 0.46 atomic weight) of elemental sulfur. The refluxing is continued for an additional two hours and thereafter the batch is stripped of alcohol and steam-distilled to remove the para-toluidine by-product. Thereupon the steam-distilled residue is cooled to about 0° C. and the crude para-aminobenzaldehyde separated via centrifugation as a noncrystalline solid, which solid on warming to room temperature liquifies. The yield of para-aminobenzaldehyde based upon the para-nitrotoluene charged is approximately 97% by weight. In order to preserve the para-aminobenzaldehyde for subsequent use it is converted into its neutral sulfuric acid salt.

Although the invention has been described with respect to certain sulfides of sodium it is to be understood that other alkali metal sulfides of the formula $M_2S_x$, where $x$ is greater than 1 but less than 4 may be employed, for example such mixtures of sulfides as $M_3S_4$, $M_3S_5$, $M_4S_3$, $M_4S_5$, $M_4S_7$ and the like where M is an alkali metal such as sodium or potassium. While for any given molecule $x$ is a whole number, it is convenient to designate $x$ as a function of the average molecular weight of the alkali metal sulfide and more particularly to the total atomic weight equivalents of sulfur combined with each two atomic weights of the alkali metal of the alkali metal sulfide ($M_2S_x$) charged.

While the amount of elemental sulfur added to the reaction mixture may vary widely depending upon reaction conditions, etc., it will be in an amount sufficient to maintain the atom ratio of alkali metal charged as the sulfide to sulfur in the range of about 1:1–2. In general 0.5 to 6 atomic weights, but preferably 1 to 3 atomic weights of sulfur, for each molecular proportion of alkali metal sulfide ($M_2S_x$) produces optimum results.

Although in the preferred embodiment of this invention approximately one molecular weight of the alkali metal sulfide is employed to convert approximately three molecular weights of para-nitrotoluene to para-aminobenzaldehyde, it is advantageous to employ a small excess of the sulfide, for example, up to about a 10% mol excess. Alternatively, provided the ratio of alkali metal charged as the sulfide to sulfur is maintained within the aforedescribed limits throughout the course of the reaction larger, or smaller amounts of sulfide can be used, for example, about 1–9 molecular proportions of sulfide may be employed to convert 10 molecular proportions of para-nitrotoluene to para-aminobenzaldehyde.

In carrying out the process of this invention, although not necessary, it is preferable that inert organic solvents for the sulfide be employed in addition to water. Among the inert organic solvents which may be employed are methanol, isopropanol, butanol, glycol, propylene glycol, dioxane, diethyl ether, dibutyl ether and the like. Of these solvents, the water-miscible solvents are preferred. While any water-miscible amount of the preferred solvents may be employed, amounts not in excess of the water content of the reaction system are ordinarily sufficient. The water-miscible solvents are conveniently incorporated in the reaction mix with the aqueous alkali metal hydroxide solution. Ethyl alcohol is the preferred inert solvent. Although it has been alleged that alcohols are reactive with alkali metal sulfides, for purposes of this invention alcohol solvents are to be considered inert.

The optimum temperature for carrying out the process of this invention is the reflux temperature and such obviously will vary with the system. Good results are obtained by carrying out the reaction within the range of about 25° C. of the reflux temperature. However, any temperature which provides sufficient heat to effect the reaction is contemplated.

The elemental sulfur may be introduced to the reaction mix in any manner well-known to those skilled in the art. For example, it may be added either in powdered or crystalline form or as molten sulfur.

It is to be noted that the alkali metal content of the alkali metal hydroxide employed in the aforedescribed examples remains constant throughout the course of the reaction and is not included in the sulfur-alkali metal atom ratios as set forth in the present specification and claims. The presence of an alkali metal hydroxide such as sodium or potassium hydroxide is necessary and the amounts employed may vary from 0.5–10 molecular proportions per molecular proportion or para-nitrotoluene. However, from an economy standpoint about 1–3 molecular proportions of alkali metal hydroxide per molecular proportion of paranitrotoluene is satisfactory.

Obviously the procedures described in the foregoing examples may be widely varied without departing from the spirit or scope of the present invention.

What is claimed is:

1. In the manufacture of para-aminobenzaldehyde from para-nitrotoluene, the step which comprises introducing elemental sulfur into a heated mixture comprising para-nitrotoluene, an alkali metal sulfide of the formula $M_2S_x$, where M is an alkali metal and where $x$ is a whole number, and an aqueous solution of an alkali metal hydroxide, the rate of sulfur addition being such that the atom ratio of alkali metal charged as the sulfide to sulfur throughout the reaction is maintained at about 1:1 to 2.

2. In the manufacture of para-aminobenzaldehyde from para-nitrotoluene, the step which comprises introducing elemental sulfur into a heated mixture comprising para-nitrotoluene, a sodium sulfide of the formula $Na_2S_x$, where $x$ is an integer greater than 1 but less than 4, and an aqueous solution of sodium hydroxide, the rate of sulfur addition being such that the atom ratio of alkali metal charged as the sulfide to sulfur throughout the reaction is maintained at about 1:1 to 2, the molecular ratio of sodium sulfide to para-nitrotoluene being about 1 to 9:10.

3. In the manufacture of para-aminobenzaldehyde from para-nitrotoluene, the step which comprises introducing elemental sulfur into a heated mixture comprising para-nitrotoluene, an alkali metal sulfide of the formula $M_2S_x$, where M is an alkali metal and where $x$ is an integer greater than 1 but less than 4, and an aqueous water-miscible organic liquid solution of an alkali metal hydroxide, the rate of sulfur addition being such that the atom ratio of alkali metal charged as the sulfide to sulfur throughout the reaction is substantially equi-atomic, the molecular ratio of alkali metal sulfide to para-nitrotoluene being about 1 to 1.1:3, the molecular ratio of alkali metal hydroxide to para-nitrotoluene being about 0.5 to 10:1.

4. In the manufacture of para-aminobenzaldehyde from para-nitrotoluene, the step which comprises introducing elemental sulfur into a refluxing mixture comprising para-nitrotoluene, a sodium sulfide of the formula $Na_2S_x$, where $x$ is an integer greater than 1 but less than 4, and an aqueous alcoholic solution of sodium hydroxide, the rate of sulfur addition being such that the atom ratio of sodium charged as the sulfide to sulfur throughout the reaction is maintained at about 1:1 to 2, the molecular ratio of sodium sulfide to para-nitrotoluene being about 1 to 9:10, the molecular ratio of sodium hydroxide to para-nitrotoluene being about 0.5 to 10:1, the amount of elemental sulfur added being about 0.5 to 6 atomic weights for each molecular proportion of the sodium sulfide.

5. In the manufacture of para-aminobenzaldehyde from para-nitrotoluene the step which comprises introducing elemental sulfur into a refluxing mixture comprising para-nitrotoluene, a sodium sulfide of the formula $Na_2S_x$, where $x$ is an integer greater than 1 but less than 4, and an aqueous-ethanol solution of sodium hydroxide, the rate of sulfur addition being such that the atom ratio of sodium charged as the sulfide to sulfur throughout the reaction is maintained at about 1:1 to 2, the molecular ratio of sodium sulfide to para-nitrotoluene being about 1 to 1.1:3, the molecular ratio of sodium hydroxide to para-nitrotoluene being about 0.5 to 10:1, the amount of elemental sulfur added being about 0.5 to 6 atomic weights for each molecular proportion of the sodium sulfide.

6. In the manufacture of para-aminobenzaldehyde from para-nitrotoluene, the step which comprises introducing elemental sulfur into a refluxing mixture comprising para-nitrotoluene, a sodium sulfide of the formula $Na_2S_x$, where $x$ is an integer greater than 1 but less than 4, and an aqueous-ethanol solution of sodium hydroxide, the rate of sulfur addition being such that the atom ratio of sodium charged as the sulfide to sulfur throughout the reaction is substantially equi-atomic, the molecular ratio of sodium sulfide to para-nitrotoluene being about 1 to 1.1:3, the molecular ratio of sodium hydroxide to para-nitrotoluene being about 0.5 to 10:1, the amount of elemental sulfur added being in the range of about 1 to 3 atomic weights for each molecular proportion of the sodium sulfide.

7. In the manufacture of para-aminobenzaldehyde from para-nitrotoluene the step which comprises introducing elemental sulfur into a refluxing mixture comprising para-nitrotoluene, sodium disulfide and an aqueous-ethanol solution of sodium hydroxide, the ratio of sulfur addition being such that the atom ratio of sulfur to sodium charged as the sulfide throughout the reaction is substantially equi-atomic, the molecular ratio of sodium disulfide to para-nitrotoluene being about 1 to 1.1:3, the molecular ratio of sodium hydroxide to para-nitrotoluene being about 1 to 3:1, the amount of elemental sulfur added being approximately 2 atomic weights for each molecular proportion of sodium disulfide.

References Cited in the file of this patent

UNITED STATES PATENTS

| | | |
|---|---|---|
| 2,608,582 | Huey et al. | Aug. 26, 1952 |

FOREIGN PATENTS

| | | |
|---|---|---|
| 86,874 | Germany | May 7, 1896 |
| 87,255 | Germany | June 1, 1896 |